Jan. 20, 1970  W. L. McNAMARA  3,490,326
PIVOTED SHEAR BLADES FOR CUTTING GLASS GOBS
Filed Oct. 9 1967  3 Sheets-Sheet 1

INVENTOR.
WILLIAM L. McNAMARA
BY
Norman O. Holland
ATTORNEY

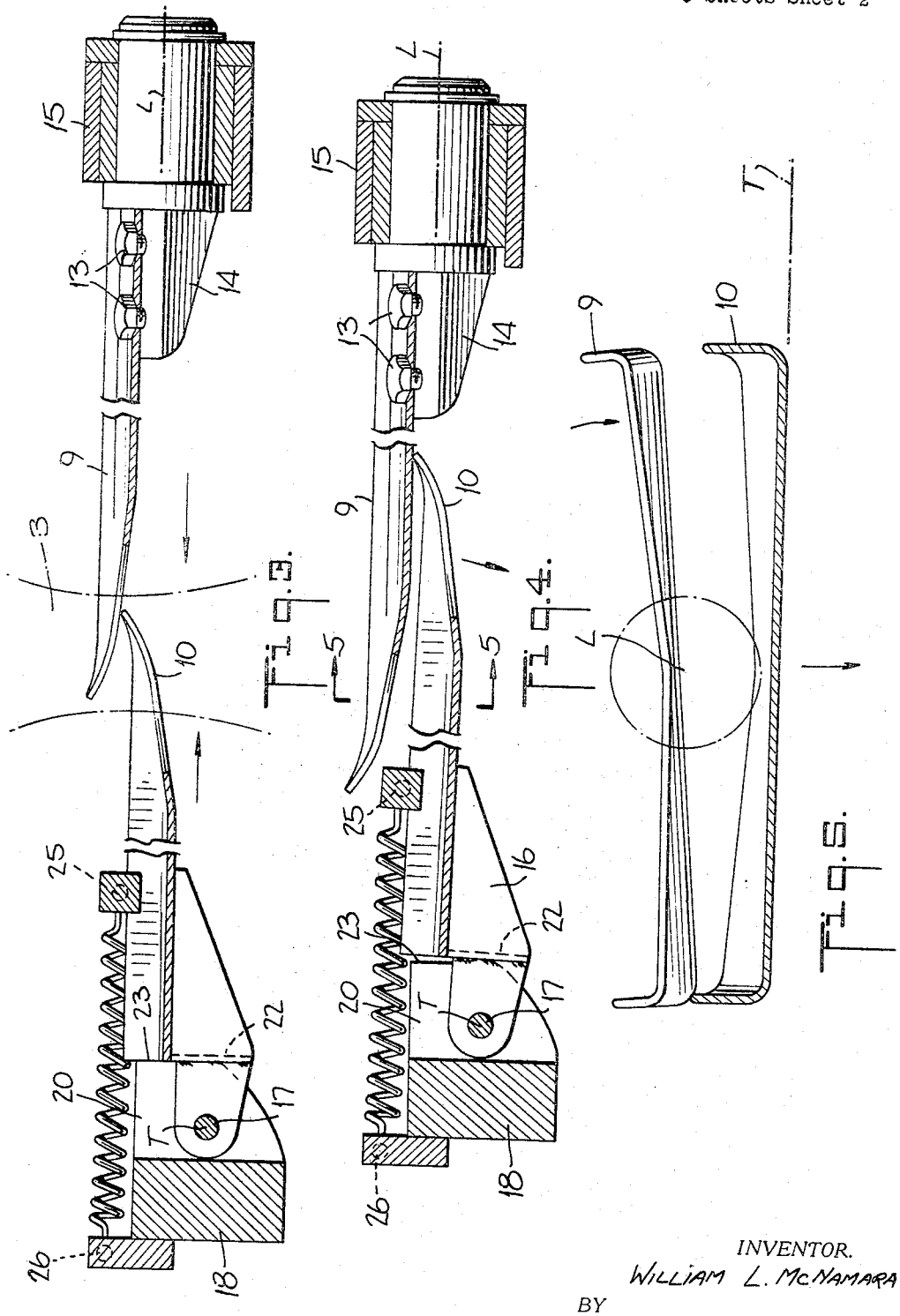

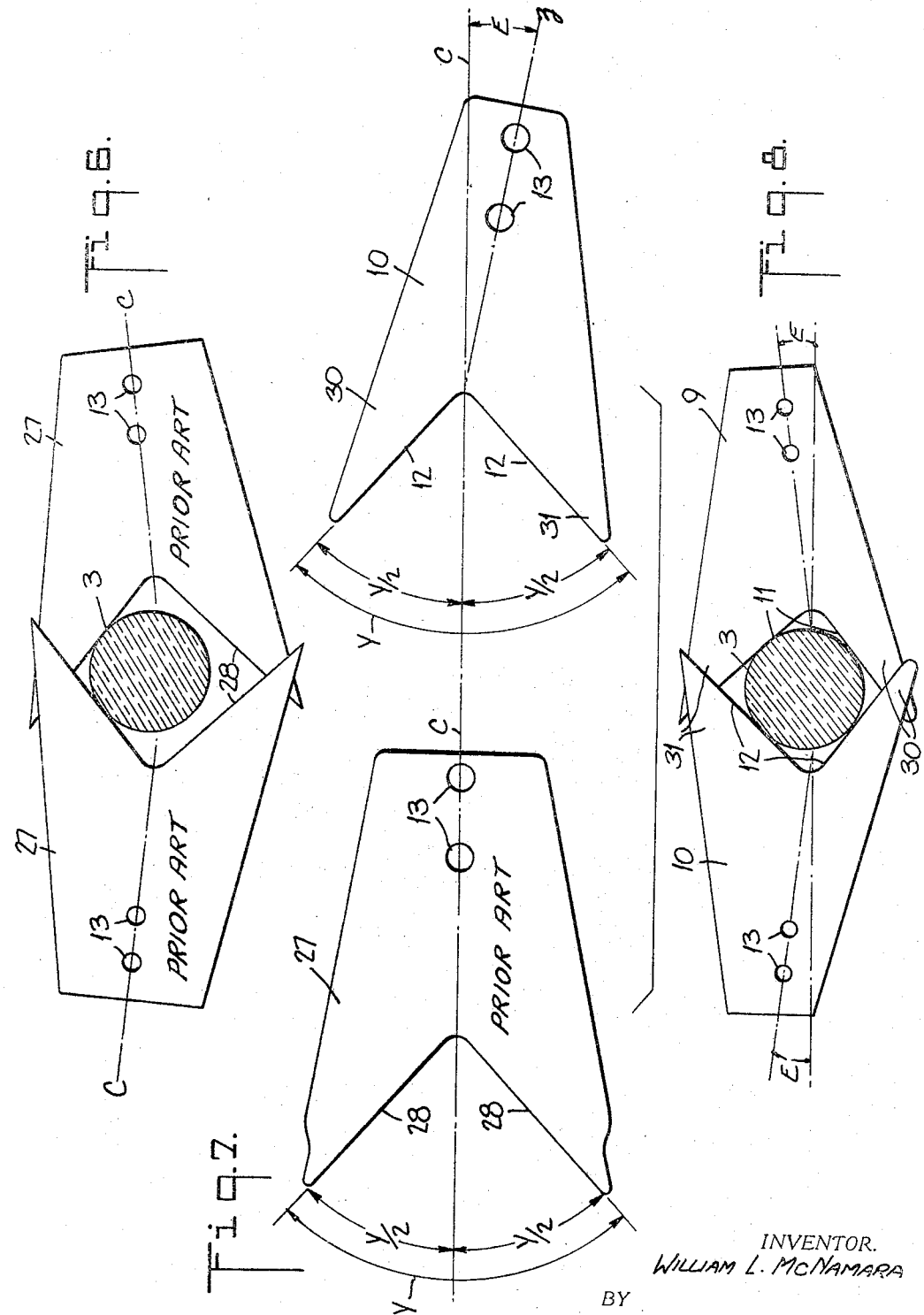

3,490,326
PIVOTED SHEAR BLADES FOR CUTTING GLASS GOBS
William L. McNamara, Lancaster, Ohio, assignor to Anchor Hocking Corporation, a corporation of Delaware
Filed Oct. 9, 1967, Ser. No. 673,842
Int. Cl. B26d 1/00
U.S. Cl. 83—600                                11 Claims

ABSTRACT OF THE DISCLOSURE

An improved mounting for shear blades used in cutting gobs of glass from a stream of glass flowing from a glass furnace forehearth orifice wherein one of the shear blades is mounted for pivoting about a transverse axis on its support arm. The carrier of the pivoting blade has a flat surface which bears against a corresponding surface on the support arm and is held in this position by suitable mounting springs. When the shears are closed and contact each other, the pivoting blade is thereby permitted to swing on its pivot to accommodate itself to the particular position of the opposite blade which may also be tiltable about its longitudinal axis to achieve improved self-alignment. In addition, to maintain a simultaneous four point contact of the shear blade cutting edges with the gob during the swinging action of the blade support arms, the blades are formed with an asymmetrical blade shape.

Cross-references

This invention is an improvement upon my application Ser. No. 566,503 filed July 20, 1966 and assigned to the assignee of the present invention.

Background of the invention

The present invention relates to the manufacture of glass and more particularly to an improved mounting for shear blades such as are used in cutting gobs of glass from a stream of glass flowing from a glass furnace forehearth orifice.

Sears in accordance with the present invention are employed at the outlet of a glass furnace forehearth in the manufacture of glass articles. The glass is fed from the furnace forehearth through a feeder orifice which directs the molten glass in a generally vertical stream from the furnace outlet. Gob-cutting shears are employed to periodically sever the lowermost portion of this flowing stream into a discrete glass gob of predetermined volume. This gob after being severed is permitted to fall or slide down a suitable feed chute into a glass forming mold or other glass forming device.

The cutting of these gobs of glass is a critical operation since minor defects or irregularities caused as the gob is cut may result in a defectively formed glass article. For example, a surface defect is sometimes present upon completely formed glass articles in the form of a long thin scar. This defects is called a shear mark as it has been found to result from improper gob cutting and particularly from a misalignment or improper engagement of the shear blades. These marks are objectionable and frequently result in unacceptable glassware. They are particularly troublesome since the defect or misalignment in the shears which causes the shear marks may injure a significant number of articles before the trouble is detected and corrected.

Even the slightest misalignment of the four shearing edges has been found to be capable of forming objectionable shear marks. This misalignment, which may be caused by an initial misalignment in setting or by unequal wear or improper blade movement or a variety of other reasons, has been found to cause shear marks to such an extent that normal glass flow action in the gob is insufficient to remove the mark. The result is the retention of the mark throughout the glass-forming operation so that a mark of significant and objectionable size is present on the finished article making it unacceptable.

Previous attempts to reduce these shear marks included mounting the shear blades so that their shearing surfaces met one another during the gob cutting stroke under relatively great pressure. This pressure caused one or both of the blades to warp or bend so that the shearing edges accommodated themselves, however, this high pressure also caused rapid and uneven blade wear which then caused the deformation of the blades so that shear marks again resulted.

Summary of the invention

The improved shears of the present invention has been found to virtually eliminate such marks by providing self-aligning mountings for the shear blades. As will be further described below, not only has an unexpected operating improvement been obtained with these mountings, but the degree of self-alignment required for this improvement has been found to be relatively slight so as to significantly reduce blade wear. The necessary but slight correction or self-alignment required has been found to be obtainable with these improved, simple, rugged, and automatically operated self-aligning mountings. The improved mountings of the present invention provides for the pivoting of one shear blade about the axis of its support arm so that when the blades are closed it will be permitted to properly align itself in cooperation with its opposite member. The opposite blade may be permitted to pivot about the axis of its carrier to further facilitate proper alignment. Also, the blades have asymmetric shapes or mountings to accommodate for the swinging action of the support arms and maintain simultaneous four point contact of their edges with the glass gob.

Accordingly, an object of the present invention is to provide a new and improved mounting for glass cutting shear blades.

Another object of the present invention is to provide a self-aligning or self-adjusting mounting for shear blades.

Another object of the present invention is to provide a self-aligning shear blade mounting combining ruggedness and simplicity with precise operation.

Another object of the present invention is to provide an improved shear blade mounting for providing better gob formation and a resulting reduction in the cost of the manufacture of glass articles.

Another object of the present invention is to provide an improved shear blade mounting for substantially eliminating shear marks in finished glass articles.

A further object of the present invention is to provide an improved shear blade mounting wherein each of the blades is permitted to pivot about a suitable axis to achieve improved self-alignment.

Another object of the present invention is to provide an asymmetrically shaped blade which will maintain simultaneous four point contact of the blade edges with the glass gob under the swinging action of the support arm during the cutting operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 3 is an enlarged detailed side view illustrating the initial engagement between the tips of the shear blades;

FIG. 4 is a view as taken in FIG. 3 illustrating the action of the blade and mount of the present invention as the blades slide upon each other;

FIG. 5 is an end view taken along line 5—5 on FIG. 4 illustrating the engaging action of both blades when provided with the respective pivotal mountings;

FIG. 6 illustrates the engagement of a gob by the prior art blades;

FIG. 7 is a showing comparing the old and the new blade shapes and mounting; and FIG. 8 illustrates the improved blade shape and mounting engaging a glass gob.

Figure 1:
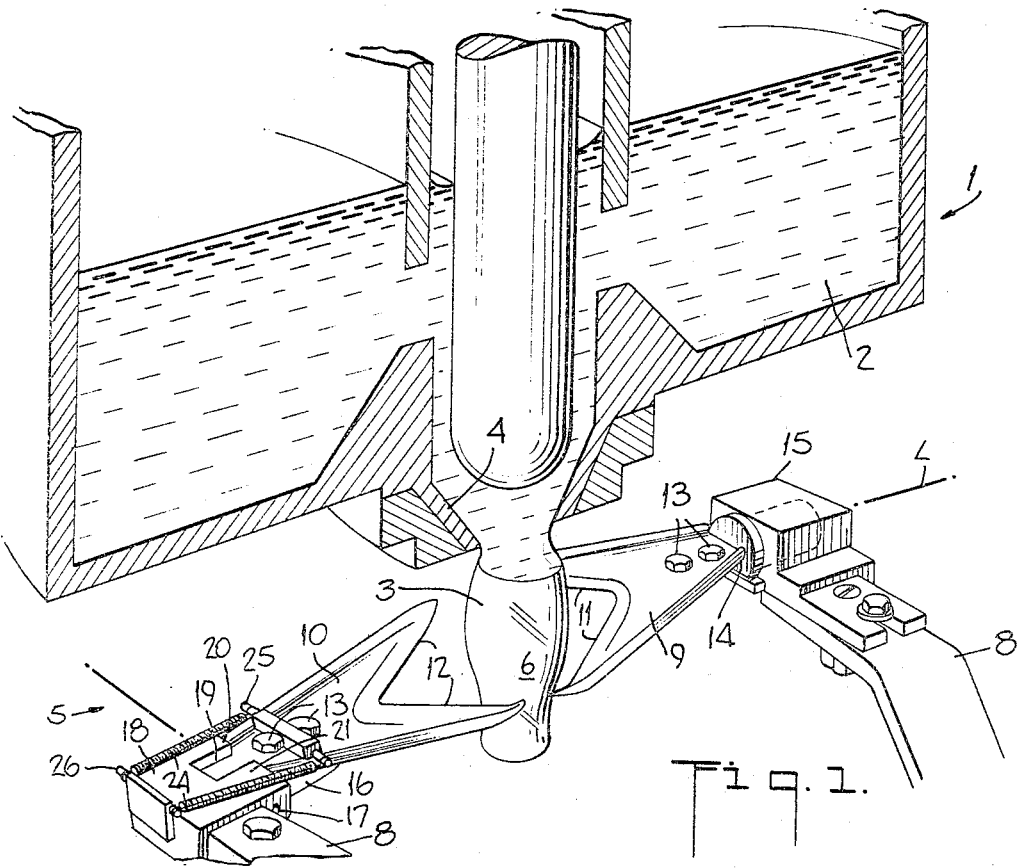
FIG. 1 is a perspective view partially in section illustrating a feeder with the improved shear blades moving towards the gob cutting position.

FIG. 1 of the drawings illustrates the forehearth 1 of a glass furnace in which molten glass 2 is being delivered in a downwardly flowing stream 3 from the feeder outlet 4. The gob cutting shears 5 in accordance with the present invention are mounted adjacent the stream of glass 3 and are positioned to periodically sever the end portion 6 of the glass stream 3 causing it to fall free of the stream 3 as an individual glass gob and into a mold located beneath.

Figure 2:
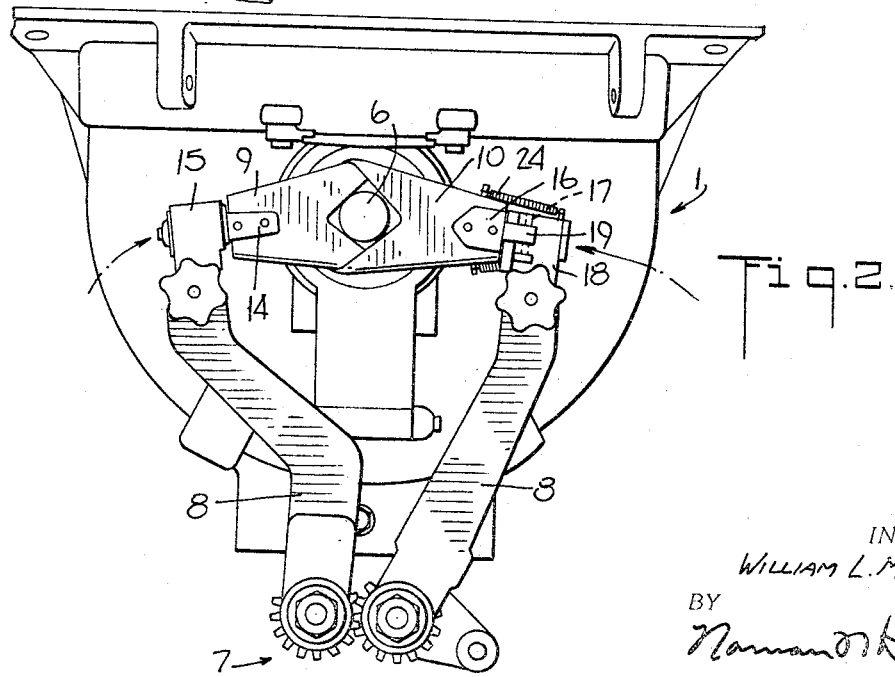
FIG. 2 is a bottom plan view illustrating the shears beneath the forehearth in their cutting position.

A suitable mechanical drive (not illustrated) operates to intermittently swing the shears from an open position as illustrated in FIG. 1 through a cutting position as illustrated in FIG. 2 through the cooperating gears 7 at the base of the shear operating arms 8. This cutting operation is adjusted so that a gob 6 of predetermined volume is severed from the slowly flowing glass stream 3 by timing the operation with respect to the cross-section of the stream.

The shear blades 9 and 10 perferably have a generally V-shaped form as illustrated so that the four central edges 11 and 12 may close into engagement with one another and so that a double shearing action is provided between the oppositely positioned blades 9 and 10. When the shearing edges of each pair are in firm sliding engagement, the above described shearing operation severs the gob 6 with no objectionable marks or surface irregularities resulting at the surface of the glass gob.

Even the slightest misalignment of the four shearing edges 11 and 12, however, has been found to form objectionable shear marks. Such a misalignment, which may be caused by initial mismounting or by unequal wear or improper blade movement or for a variety of other reasons, has been found to increase the shear marks to an extent whereby normal glass flow action in the gob 6 is insufficient to remove the mark. The result is the retention of the mark throughout the glass-forming operation so that a mark of significant and objectionable size is present on the finished article making it unacceptable.

The improved mountings of the present invention permit relative motion between the mating blades 9 and 10 during the cutting operation to insure proper alignment upon engagement of the glass stream 3. As shown in FIGS. 1 through 5, one of blades 9 is mounted to permit pivoting about its longitudinal axis L while the other blade 10 is pivotable about its transverse axis T. Also, as shown in FIGS. 6 through 8, the blades are asymmetrical in shape with the orientation of their cutting edges offset with respect to the attachment points on the mounting in order to accomplish simultaneous four point contact of the cutting edges with the glass stream as the blades swing into the cutting operation.

The particular overall details of the pivotable mountings are perhaps best seen in FIG. 1. The blade 9 is attached by means of two bolts 13 to a carrier member 14 which fits into a mounting block 15 adjustably attached to the support arm 8. The blade carrier 14 is permitted to pivot about its longitudinal axis L within the mounting block 15. The particular details of this mounting are covered in my separate co-pending application Ser. No. 566,503, filed July 20, 1966, and forms only such part of the present invention as the advantages derived from its combination with the improved mounting about to be disclosed. The particular mounting of the present invention is embodied in the arrangement shown in connection with the blade 10.

The mounting 5 of the blade 10 is designed to permit the blade to pivot about its transverse axis T upon engaging its opposite member 9 during the cutting operation. As seen with reference to FIGS. 1 through 4 the mounting 5 comprises a blade carrier 16 to which the blade 10 is attached by bolts 13. The carrier 16 is attached by means of a pivot pin 17 to a mounting block 18 on the end of the support arm 8. An arm 19 on the blade carrier 16 is transversely bored to accept the pivot pin 17 and fits between two arms 20 and 21 on the mounting block 18 which are similarly bored to accept the opposite ends of the pivot pin 17. In order to maintain the shear blade 10 in a generally level orientation the blade carrier 16 on either side of the pivot arm 19 is provided with flat surfaces 22 which abut similarly formed flat surfaces 23 on the outer faces of the mounting block arms 20 and 21. These flat surfaces 22 and 23 are held in abutment by means of the spring members 24 which are connected to a transversely arranged pin 25 mounted on the shear blade 10 and a similar pin 26 mounted on the mounting block 18. The purpose and advantages of this mounting will be seen by reference to FIGS. 3 through 5 which show the action of the mating blades 9 and 10 during the cutting operation.

As shown first in FIG. 3, the blades 9 and 10 in the inactive or unmated condition are held in a generally level orientation by their respective mountings. The mounting 5 of the present invention has the springs 24 acting between the pins 25 and 26 to hold the flat surfaces 20 and 23 on the blade carrier 16 and the mounting block 18 in abutment leveling blade 10. As the ends of the blades 9 and 10 strike each other just prior to engaging the glass stream 3 for cutting, the blades 9 and 10 will be tiltably reoriented by the action of the respective surfaces sliding upon each other. Any deviation or misalignment of the blade 10 from the plane of action of the blade 9 is accommodated for by the pivoting of the blade 10 about the pin member 17. Thus, as long as the blade 9 has its longitudinal axis L fixed in a generally level plane the blade 10, whose longitudinal axis is permitted to reorient itself about the transversally arranged pivot pin 17, will yield and pivot downwardly sliding on the undersurface of blade 9. If the blade 9 is permitted to pivot about its longitudinal axis L then any misalignment of the two blade surfaces from the level will be compensated for by the pivoting of the blade 9 about its longitudinal axis L into sliding alignment with the upper surface of the blade 10 which is fixed against movement in this orientation. The pivoting action of each of the blades with respect to the other is shown by means of the arrows in FIG. 5. It will be seen by reference to this figure that by virtue of the combination of these pivoting mountings, in contrast to the fixed mountings of the prior art, the two blades may reorient themselves to insure improved sliding alignment between the two at the point at which the glass stream 3 is engaged. It will also be seen that even if the blade 9 has a fixed mounting the action of the mounting 5 will give significantly improved alignment over that achieved by the prior art and a reduced occurrence of the shear marks.

A further requirement to insure against the undesirable shear marks is that the edges 11 and 12 of the mating blades 9 and 10 achieve simultaneous four point contact with the glass stream 3 as the gob 6 is being cut. In the past, symmetrically shaped blades have been used with corresponding V-shaped cutting edges. These blades were mounted on the blade carriers by bolts 13 located along their center lines C as shown in FIG. 6. This blade shape and mounting was found to be satisfactory for carrying out the cutting operation when the blades were moved into engagement directly along the same center line. However, when the cutting operation is achieved by a swinging motion of the blades along an arcuate path, as shown in FIGS. 1 and 2 in the presently disclosed operation, simultaneous contact of the four edges is difficult to achieve. FIG. 6 shows the actual engagement which has been found to occur while cutting gobs of approximately 3¼" diameter. It is thus a further feature of the mounting of the present invention to mount the shear blades in such a manner as to insure four point contact of the cutting edges with the glass stream using improved blades in accordance with the present invention and the presently disclosed cutting operation.

FIG. 7 shows a comparison of a blade 27 of the prior art and the improved blade 10 of the present invention. The known blade 27 has edges 28 of equal length arranged at an angle Y. The two bolts 13 which mount the blade 27 to its carrier are fastened along the axis of symmetry or centerline C of the blade 27. Both blades used in the cutting operation are of this identical shape and mounting. As previously stated when a bade of this type is used on a system wherein the support arms are swung in an arcuate path, uneven gob engagement will result as shown in FIG. 6. It has been found that by mounting the blade at an agle offset from the centerline of the edges, the desired four point contact with the glass stream is accomplished. The edges 12 of the improved blade 10 by contrast with those of the blade 27 are slightly shorter with one arm 30 being shorter than the other arm 31. The arm 30 also has a smaller surface area than the arm 31. While in each case the angle Y between the blade edges is the same, the mounting bolts 13 connecting the improved blade 10 to the blade carrier are fastened along a line Z which is offset from the line C bisecting the angle Y of the edges of each blade. The proper offset angle E may be empirically determined when setting up the shear blade system, each given case depending upon the size of the gob to be cut and the cutting angle Y of the blade edges. When blades of the improved form were used in an identical system in place of these shown in FIG. 6 the resulting engagement of the glass stream stream was as desired and is shown in FIG. 8.

It will thus be seen that an improved mounting arrangement has been provided for the shear blades used to cut glass gobs coming from the forehearth orifice of a glass furnace during the glass making operation. One of the blades is mounted to pivot about its transverse axis or both of the blades may be pivotally mounted respectively about the different axes to permit accommodating movement into sliding alignment upon engaging each other. Both blades are suitably offset mounted on their support arms to insure precise aligned four point contact of the glass stream during the cutting operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a shear means for cutting gobs of glass from a stream of molten glass which includes a pair of cooperating shear blades each having a pair of cutting edges arranged in a V shape and blade operating means for providing relative movement of said blades between an open position spaced from the glass stream and a closed position with the blade edges in shear engagement with one another, the improvement which comprises blade mounting means for adjustably attaching one of said blades to said blade operating means to pivot about its transverse axis, said blade being attached to said mounting means along an axis offset from the line bisecting the angle between its cutting edges.

2. Shear means as claimed in claim 1 including blade mounting means for the other blade which permits pivoting about its longitudinal axis.

3. Shear means as claimed in claim 1 wherein said blade mounting means comprises spring means which holds said blade in place when said shear means is in the open position.

4. Shear means as claimed in claim 1 wherein the blade has one cutting edge longer than the other.

5. In a shear means for cutting gobs of glass from a stream of molten glass and including a pair of cooperating shear blades and blade operating means for providing relative movement of said blades between an open position spaced from the glass stream and a closed position in shear engagement with one another, the improvement which comprises blade mounting means pivotally attaching one of said blades to said blade operating means for adjustment about an axis transverse to its movement to permit shearing alignment with the other blade in the closed position.

6. A shear means as claimed in claim 5 wherein said blade mounting means comprises a blade carrier for holding said blade, said carrier having a flat surface portion at one end, said flat surface adapted to bear against a flat surface on the blade operating means.

7. A shear means as claimed in claim 5 wherein said blade mounting means comprise spring means which hold said flat surfaces in engagement when said shear means is in the open position.

8. A shear means as claimed in claim 5 wherein the other blade is mounted to permit pivoting about its longitudinal axis.

9. In a shear means for cutting gobs of glass from a stream of molten glass having a generally circular cross section and which includes a pair of cooperating shear blades each having a pair of cutting edges arranged in a V shape and blade operating means for providing relative movement of said blades along arcuate paths between an open position spaced from the glass stream and a closed position with the blade edges in shear engagement with one another, the improvement which comprises said V shaped cutting edges being positioned on said blades whereby all of said edges contact the molten glass simultaneously.

10. A shear means for cutting gobs of glass from a stream of molten glass comprising a pair of cooperating shear blades each having a pair of cutting edges arranged in a V shape, blade operating means for providing relative movement of said blades in an arcuate path between an open position spaced from the glass stream and a closed position with the blade edges in shear engagement with one another and the glass, blade mounting means for one of said blades permitting it to pivot about its longitudinal axis and blade mounting means for the other blade permitting it to pivot about an axis transverse to its movement, said blades being attached to said mounting means along an axis at an angle with the center lines of their V shaped edges.

11. In a shear means for cutting gobs of glass from a stream of molten glass having a generally circular cross section and which includes a pair of cooperating shear blades each having a pair of cutting edges arranged in similar V shaped notches and blade operating means for providing relative movement of said blades along arcuate paths between an open position spaced from the glass stream and a closed position with the blade edges in shear engagement with one another, the improvement which comprises the center lines bisecting said V shaped notches being positioned in a common plane normal to said blades when said blades engage said glass stream whereby all of said edges contact the molten glass simultaneously.

References Cited

UNITED STATES PATENTS

| | | | |
|---|---|---|---|
| 1,620,292 | 3/1927 | Samuelson | 65—334 X |
| 1,626,737 | 5/1927 | La France | 65—334 X |
| 1,862,979 | 6/1932 | Peiler | 65—334 X |
| 2,090,082 | 8/1937 | Wadsworth | 83—623 X |
| 2,680,937 | 6/1954 | Peiler | 83—600 X |
| 2,920,421 | 1/1960 | Zimmerman | 83—600 |

WILLIAM S. LAWSON, Primary Examiner

U.S. Cl. X.R.

83—694, 698; 65—334